Patented May 18, 1943

2,319,696

UNITED STATES PATENT OFFICE 2,319,696

DEHYDROABIETIC ACID DERIVATIVE

Edwin R. Littmann, Westfield, N. J., assignor to Hercules Powder Company, Wilmington, Del., a corporation of Delaware No Drawing. Original application September 29, 1938, Serial No. 232,315. Divided and this application March 14, 1941, Serial No. 383,366

8 Claims. (Cl. 260—97)

This invention relates to new compositions of matter and methods of producing them. It relates more particularly to derivatives of dehydroabietic acid and to methods for their production.

In my co-pending application for United States Letters Patent, Serial No. 84,877, filed June 12, 1936, which is in turn a continuation-in-part of my application for United States Letters Patent, Serial No. 6403, filed February 13, 1935, I described a process for treating rosin, rosin acids, or other compounds containing the hydrocarbon nucleus of a rosin acid with an active hydrogenation catalyst, such as nickel, copper, chromite, platinum, palladium, etc., to produce a change in the chemical and physical properties of the rosin or rosin derivative, the resultant product having a greatly decreased unsaturation and in many cases a higher melting-point and improved properties. These changes in the physical and chemical characteristics of the material are believed to be due to an intra- and inter-molecular rearrangement of the hydrogen atoms occurring therein, with no change in the carbon skeleton. The process consists essentially of treating the rosin, rosin acid, or compound containing the hydrocarbon nucleus of a rosin acid with the active hydrogenation catalyst at an elevated temperature, the optimum range being from about 150° C. to about 250° C.

Further examination of the product of the above treatment of rosin compounds has led to the observation that it consists of a mixture of at least two types of chemical compounds, the major portion containing an aromatic ring, another portion being a saturated derivative of the rosin compound. I have separated from the product obtained by the treatment of a rosin acid the major portion consisting of an acid which I have identified as dehydroabietic acid, inasmuch as it appears to contain two less hydrogen atoms than abietic acid, contains one aromatic ring, and has the known physical constants of dehydroabietic acid as described in the literature. The dehydroabietic acid may be separated from the treated rosin by various means, crystallization from a solvent solution being a practical method.

Thus, by way of example, to 125 parts by weight of the product of the treatment of "I" wood rosin with a palladium catalyst under the conditions described in the application, Serial No. 84,877, filed June 12, 1936, are added 170 parts by weight of acetone. After heating to effect solution the product is cooled and the crystals separating are removed by filtration, washed with cold acetone and dried. Successive concentrations of the mother liquor yield additional crystals, a total yield of about 73 parts by weight of the crystalline material being obtained. Solvents such as ethyl acetate, ethyl alcohol, methyl alcohol, petroleum ether, etc., may be used in place of acetone.

The crystalline, dehydroabietic acid isolated as above has been found to have the following characteristics:

| | |
|---|---|
| Melting point °C | 160–161 |
| Refractive index ($n20/D$) | 1.5371 |
| Specific rotation | +60° |
| Neutral equivalent | 299.5 |
| Molecular weight | 300 |

It has been identified as having the following structural formula:

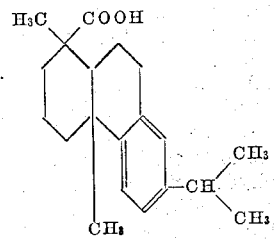

Other methods of preparing dehydroabietic acid have been described in the literature and the above structural formula has been accepted as representing the structure of the acid. However, some question exists concerning the exact location of the methyl and isopropyl groups. For the purpose of defining this invention these groups are located as shown.

In my co-pending application, Serial No. 226,573, filed August 24, 1938, I have described derivatives of dehydroabietic acid involving substitution in the carboxyl group. The derivatives are esters, salts, acyl halides, amines, ethers, primary alcohol, etc., which contain the hydrocarbon nucleus of dehydroabietic acid.

Now, in accordance with the present invention, I may prepare amino or substituted amino derivatives of dehydroabietic acid itself or compounds containing the hydrocarbon nucleus of dehydroabietic acid, in which the amino or substituted amino groups are in the aromatic ring of the hydrocarbon nucleus of dehydroabietic acid. Thus, in general, the derivatives which I may prepare in accordance with this invention will be amino or substituted amino derivatives of dehydroabietic acid itself or of esters, salts, acyl halides, amides, ethers, primary alcohols, etc., derived from dehydroabietic acid and containing the hydrocarbon nucleus of dehydroabietic acid.

As a general expression of my invention, the derivatives which I may prepare are expressed by the following general formula:

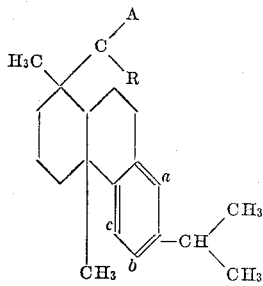

wherein A is a bivalent element or group such as O, S, H$_2$, NX, etc., where X is hydrogen or a monovalent organic radical; R is a monovalent element or group such as OH, SH, O-metal, O-NH$_4$, halogen, OX, SX, NXX, etc., where X is hydrogen or a monovalent organic radical; $a$ and/or $b$ and/or $c$ are monovalent elements or groups such as H, NH$_2$ and NX$_2$ where X$_2$ is a divalent organic radical, two monovalent organic radicals, or hydrogen and a monovalent organic radical. No more than two of the substituents $a$, $b$ and $c$ may be hydrogen within the scope of this invention.

Thus, in general, the derivatives of dehydroabietic acid which I may prepare in accordance with this invention, may or may not be substituted in the carboxyl group and will be acids, esters, salts, acyl halides, amides, ethers, primary alcohols, etc., and will be substituted in the aromatic nucleus of the dehydroabietic acid, or compound containing the hydrocarbon nucleus of dehydroabietic acid, in one or more of the three possible positions with substituents such as NH$_2$ and NX$_2$, where X$_2$ is a divalent organic radical, two monovalent organic radicals or hydrogen and a monovalent organic radical.

The amino derivatives of dehydroabietic acid itself or compounds containing the hydrocarbon nucleus of dehydroabietic acid may be prepared from the corresponding nitro derivatives by the usual reduction methods. The amino derivative produced may then be treated to obtain substituted amino derivatives, thus, the amino derivative may be diazotized and coupled to an azo coupling agent such as, for example, R-salt, beta-naphthylamine, beta-naphthol, phenol, etc., to yield azo dyestuffs. Dyes derived from dehydroabietic acid in this manner have many interesting properties which render them very attractive commercially. In reducing the dinitro derivative to give an amino derivative, the reduction may also be interrupted when only one of the nitro groups has been reduced, thus, yielding a nitro amino derivative.

It is believed that substitution in the aromatic ring occurs principally at the $a$ and $b$ positions, but under certain specific conditions, it may be possible to obtain substitution at the $c$ position. I am unable to designate in exactly which position substitution is obtained for the reason that to do so would require a very extensive research into the degradation products to give identifiable derivatives. In most instances, the exact location of the substituent group or groups is not of great importance, since the usefulness of the compounds would not be appreciably changed with the three different positions of the group or groups. I am able, however, to designate the number of substituent groups which are introduced into the aromatic ring.

Substitution in the aromatic nucleus of dehydroabietic acid or a compound containing the hydrocarbon nucleus of dehydroabietic acid by the amino or substituted amino groups may be performed on the dehydroabietic acid itself and the acid may then be treated by any of the known methods to replace the carboxyl group with any of the groups desired, or the dehydroabietic acid may first be converted to a derivative of the acid containing the hydrocarbon nucleus of dehydroabietic acid, and the resulting derivative treated to introduce the amino or substituted amino groups into the aromatic nucleus.

As examples illustrating the preparation of derivatives of dehydroabietic acid in accordance with this invention, the following are cited:

EXAMPLE 1

*Dinitrodehydroabietic acid*

To 16.5 parts by weight of 98 per cent nitric acid cooled to 0–5° C., 10 parts by weight of dehydroabietic acid were added in small portions with agitation. The mixture was then poured into cold water and the reaction product filtered off. The precipitate was washed with water, dried, then crystallized from a mixture of 3 parts by weight of acetone and one part by weight of water. The recovered product had a melting-point of 158–161° C., and a nitrogen content of about 7.3 per cent. The nitrogen content of the dinitro derivative is 7.2 per cent, based on the formula $C_{20}H_{26}O_6N_2$.

EXAMPLE 2

*Methyl dinitrodehydroabietate*

Three parts by weight of methyl dehydroabietate were added to a mixture of 5 parts by weight of 67 per cent nitric acid and 20 parts by weight of 95 per cent sulphuric acid gradually with good agitation. The mixture was then heated at a temperature of about 40 to about 50° C. for about five minutes. After cooling, the mixture was poured into cold water and the precipitated nitro derivative crystallized from a 1:3 mixture of acetone and methyl alcohol. The yield was about 2 parts by weight of the dinitro derivative having a melting-point of 192–193° C. and a nitrogen content of 6.3 per cent as compared with 6.9 per cent calculated for $C_{21}H_{28}N_2O_6$. It is a slightly yellow material crystallizing in needles.

EXAMPLE 3

*Methyl dinitrodehydroabietate*

Sixteen parts by weight of methyl dehydroabietate were added to 75 parts by weight of 98 per cent nitric acid in small portions while maintaining the temperature at about 10 to about 20° C. The reaction mixture was then poured into water, the reaction product filtered off and washed with methyl alcohol. After drying the product by exposure to air it was crystallized from a 1:3 mixture of acetone and methyl alcohol. It had the properties described in Example 2.

EXAMPLE 4

*Nitroaminodehydroabietic acid*

A mixture of 112 parts by weight of methyl alcohol, 4.2 parts by weight of the dinitrodehydroabietic acid obtained as in Example 1, and 0.1 part by weight of platinum oxide catalyst was reduced with hydrogen at room temperature and a pressure of about 50 lbs. per square inch. About 4 moles of hydrogen were absorbed for one mole of dinitrodehydroabietic acid. After removing the catalyst, the methyl alcohol was evaporated and the reaction product purified by washing with methanol. The crystalline product was chiefly nitroaminodehydroabietic acid and was canary yellow in color. It had a melting point of 280–284° C. with decomposition.

EXAMPLE 5

*Methyl nitroaminodehydroabietate*

A mixture of 100 parts by weight of acetic acid, 4.1 parts by weight of methyl dinitrodehydroabietate prepared as in Examples 2 and 3, and 0.1 part by weight of platinum oxide catalyst was reduced with hydrogen at room temperature and a pressure of about 50 lbs. per square inch. About 4 moles of hydrogen were absorbed for each mole of methyl dinitrodehydroabietate. The solution was then warmed, the catalyst filtered off, and the solution poured into cold water. The precipitate was filtered off, washed thoroughly with water, then dried. After crystallization from slightly diluted methyl alcohol the product consisting chiefly of methyl nitroaminodehydroabietate was obtained as a yellow crystalline material having a melting-point of 239–241° C.

EXAMPLE 6

*Methyl diaminodehydroabietate*

The methyl dinitrodehydroabietate prepared as in Examples 2 and 3 above was reduced with hydrogen in methyl alcohol solution at a temperature of about 150° C. and a pressure of about 2000 lbs. per square inch. The resulting diamino derivative was crystallized from dilute methyl alcohol. It had a melting-point of 133–134° C. On analysis it was found to have the following composition:

|  | Found | Calculated for $C_{21}H_{32}N_2O_2$ |
| --- | --- | --- |
|  | Per cent |  |
| Carbon | 72.6 | 72.80 |
| Hydrogen | 9.3 | 9.24 |
| Nitrogen | 7.7 | 8.08 |

It is a yellowish white powder soluble in dilute acids and is capable of being diazotized and coupled to an aromatic compound.

EXAMPLE 7

*Methyl diaminodehydroabietate dibenzoate*

From the methyl diaminodehydroabietate produced as in Example 6 numerous derivatives in which the hydrogens of the NH₂ groups are replaced by alkyl, aryl, aralkyl and acyl groups may be prepared.

By reacting the methyl diaminodehydroabietate with benzoyl chloride a benzoate may be prepared in which two acyl groups, namely C₆H₅CO-groups, replace one of the hydrogens in each of the NH₂ groups.

This diamide was prepared by agitating a mixture of 42 parts by weight of methyl diaminodehydroabietate prepared as in Example 6, 4.2 parts by weight of benzoyl chloride and 2 parts by weight of a 5 per cent solution of sodium hydroxide, agitation being continued until the mixture had cooled. The reaction product was filtered off, washed with water and purified by reprecipitation from alcohol with water. The dried reaction product had a melting-point of 208–209° C. and a nitrogen content of 5.35 per cent. Calculated for the diamide $C_{35}H_{40}O_4N_2$, the nitrogen content is 5.07 per cent.

The methyl diaminodehydroabietate may be diazotized and coupled to a suitable aromatic compound containing an amino, hydroxyl, or other activating group to produce azo dyes. A procedure for producing an azo dye in this manner is as follows:

EXAMPLE 8

*Diazotization of methyl diaminodehydroabietate and coupling to R-salt*

To 4.16 parts by weight of methyl diaminodehydroabietate prepared as in Example 6 dissolved in 100 parts by weight of water and 3 parts by weight of 37 per cent hydrochloric acid and cooled to about 5° C. were added 1.4 parts by weight of sodium nitrite. Then 8.3 parts by weight of R-salt were added. After thorough mixing the solution was made slightly alkaline with 10 per cent sodium hydroxide solution. The dye was recovered by evaporation of the solution to dryness and extraction of the dye from the salt with alcohol. The dye will dye wool a brilliant red color.

By substitution of the R-salt with beta-naphthylamine a dye is obtained which will dye wool a tannish orange color.

It will be understood that the details and examples hereinbefore set forth are illustrative only, and that the invention as herein broadly described and claimed is in no way limited thereby.

It will be understood also that the term dehydroabietic acid used herein in the examples and claims refers to the particular acid known in the literature by that name and believed to be represented by the structural formula presented herein.

This application forms a division of my application Serial No. 232,315, filed September 29, 1938, entitled "Dehydroabietic acid derivatives," now U. S. Patent 2,240,936, dated May 6, 1941.

What I claim and desire to protect by Letters Patent is:

1. As a new composition of matter, a diazotized aminodehydroabietic acid coupled to an aromatic coupling compound selected from the group consisting of benzene and naphthalene coupling compounds.

2. As a new composition of matter, a diazotized aminodehydroabietic acid coupled to R-salt.

3. As a new composition of matter a diazotized aminodehydroabietic acid coupled to a naphthylamine.

4. As a new composition of matter, a diazotized aminodehydroabietic acid coupled to beta-naphthol.

5. As a new composition of matter, a diazotized material selected from the group consisting of diazotized amino dehydroabietic acid and diazotized amino dehydroabietic acid esters coupled to an aromatic coupling compound selected from the group consisting of benzene and naphthalene coupling compounds.

6. As a new composition of matter, a diazotized material selected from the group consisting of diazotized amino dehydroabietic acid and diazotized amino dehydroabietic acid esters coupled to R-salt.

7. As a new composition of matter, a diazotized material selected from the group consisting of diazotized amino dehydroabietic acid and diazotized amino dehydroabietic acid esters coupled to naphthylamine.

8. As a new composition of matter, a diazotized material selected from the group consisting of diazotized amino dehydroabietic acid and diazotized amino dehydroabietic acid esters coupled to beta-naphthol.

EDWIN R. LITTMANN.